Feb. 10, 1948.　　　　E. L. LARSON　　　　2,435,837
CYLINDER LINER
Filed Nov. 8, 1946
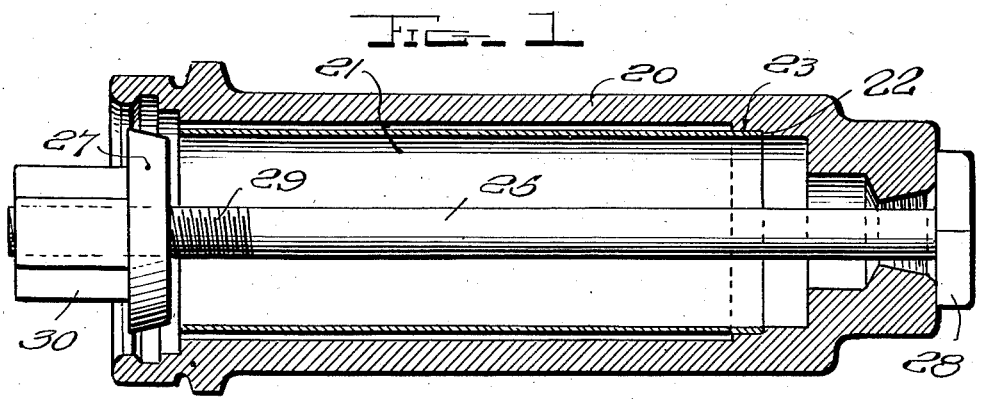
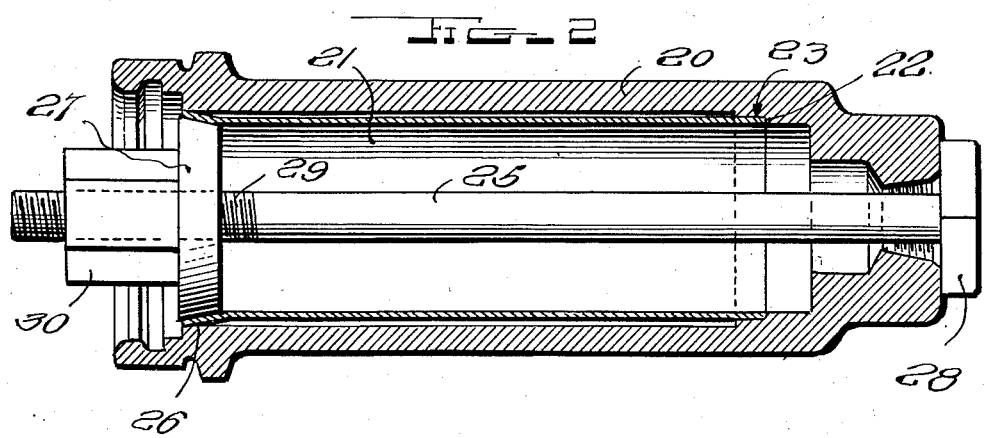
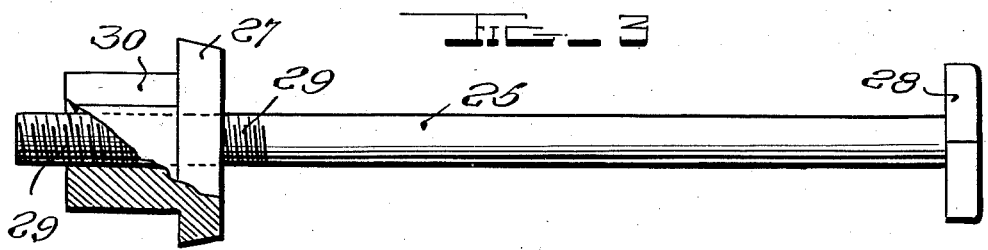
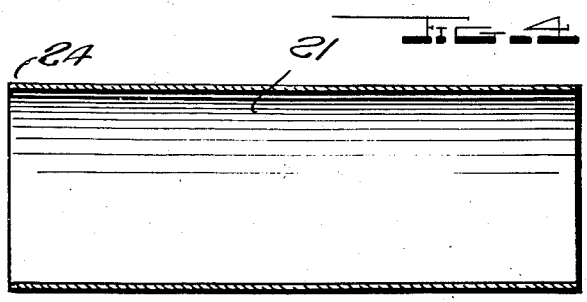
INVENTOR.
Elis L. Larson,
BY
Harry Lea Dodson.
ATTORNEY Patented Feb. 10, 1948

2,435,837

UNITED STATES PATENT OFFICE 2,435,837

CYLINDER LINER

Elis L. Larson, Chicago, Ill.

Application November 8, 1946, Serial No. 708,715

4 Claims. (Cl. 309—3)

This application relates to those devices which are designed to form a cylinder liner which can be quickly and easily replaced.

My invention more specifically relates to my co-pending application Serial No. 628,794, now Patent No. 2,412,587 of which this is a continuation-in-part.

As described in that application the liner consists of a sleeve of metal one end of which is press fitted to a shoulder formed on the inner wall of a cylinder adjacent one end. The axial bore in the cylinder being of larger diameter than the outside diameter of the sleeve or liner.

The other end of the sleeve is tapered outwardly forming a conical truncated portion or zone of approximately one-fourth inch in width. Then when the liner or sleeve is forced onto the shoulder this conical tapered portion is compressed forming a tight joint or union with the wall of the cylinder.

That application describes the condition which the cylinders of a hydraulic brake system, assume after wear i. e., they become pitted and worn so that they must be honed or re-bored and when the pitting or corrosion—the cause for which is at present unknown—is greater than .004 of an inch, over size pistons and cup washers are required. If this is not done the cylinder must be thrown away and a new one installed.

By the use of my invention, I have discovered that by restricting the extent of the frictional contact of the lining or sleeve to approximately one-fourth inch at each end that it is comparatively an easy job to remove the sleeve and replace it with a new one when necessary.

Furthermore, this can be done by a mechanic in a garage without any particular difficulty.

My present invention has for its principal object to provide means for lining a cylinder in such a manner that it can be quickly and easily removed and/or replaced without the need of providing the tapered conical end on the sleeve as described and claimed in application Serial No. 628,794, and yet secure the advantageous result of such construction.

A further object is to provide means for restoring the inside diameter of a cylinder when it becomes worn, by means of a liner or sleeve which can be used to replace a worn sleeve as hereinafter set forth.

A further object is to provide a liner or sleeve which can be quickly and easily replaced, in the field, under any and all conditions when such repair is required.

My means of accomplishing the foregoing objects may be more fully comprehended by having reference to the accompanying drawing which is hereunto annexed and is a part of this specification, in which:

Fig. 1 is a vertical longitudinal section of a standard master cylinder bored to employ my improved liner, showing the tool about to be operated;

Fig. 2 is a view similar to Fig. 1 with the liner in place and showing the union between a quarter inch zone of the liner and the cylinder wall. This view is considerably magnified in order to show the operation clearly;

Fig. 3 is a detail view of an expanding mandrel, and

Fig. 4 is a vertical sectional view of the liner.

Similar reference numerals refer to similar parts throughout the specification.

As illustrated in the drawings a master cylinder 20 is shown which has a longitudinal or axial bore, the diameter of which is slightly larger than the outside diameter of the liner or sleeve 21. This sleeve may be made of steel, brass or any other material suitable for lining the cylinder 20, in which the sleeve 21 is to be used.

Practice has shown that it is sufficient to have the space between the O. D. of the sleeve 21 and the bore of the cylinder 20, enough larger so that the sleeve will easily telescope the cylinder which is to be lined or relined.

At one end of the cylinder 20 as illustrated (which is the standard master cylinder of a hydraulic brake system) are formed the usual recesses to receive the various parts required in an hydraulic brake system, all of which is standard construction. Adjacent one end 22 of the bore I form a shoulder 23 the diameter of which should be such that when the liner 21 is forced into place it will be a press fit capable of withstanding a pressure of one thousand pounds. The other end 24 of the sleeve or lining 21 does not touch the wall of the bore.

I have found in practice that the joint or union between the cylinder wall and the sleeve or liner 21 at this point need only be a gravity tight joint which is sufficient for all practical purposes. I accomplish this in the following manner:

I insert an expanding mandrel 25 inside the end 24 of the sleeve 21. This mandrel has a slightly tapered zone or belt 27 of approximately one-fourth inch, and by expanding the metal of the sleeve in a zone 26 of approximately one-fourth inch the metal is forced outwardly and into intimate contact with the inner wall of the bore. This forms a gravity tight joint, which practice has shown is sufficient.

In Figure 4, I have shown one type of mandrel which may be used for this purpose. I do not however desire to be understood as limiting myself to any specific type of device for expanding the end of the sleeve at the zone 26, for many such devices will be obvious to those skilled in the art.

As illustrated the expanding mandrel comprises a bolt 25 which is inserted in the cylinder 20, until its head 28, contacts the end of the cylinder 20. Mounted on threads 29 cut on the bolt is the expander. This is formed with a belt or zone 27 which is slightly tapered to permit its entry into the end 24 of the sleeve or liner 21. A hexagonal head 30, is formed on the expander. By fitting a wrench (not shown) to this hexagonal head 30, and turning it upon the threads 29, on the bolt, the belt or zone 26, will contact the inner wall at the end 24, of the sleeve or liner 21, and expand it enough to bring it into intimate annular contact with the wall of the bore in the cylinder 20 and form the required joint or union.

It will be clear to those skilled in the art that since the sleeve or liner 21 is spaced from the bore of the cylinder, except for the support at each end, that such frictional contact is so slight that it is a comparatively simple job to remove a liner and/or replace it with a new one thus supplying to all intents and purposes a new cylinder in which standard pistons and cup washers can be used.

It will also be clear that this construction can be used in new cylinders thus avoiding any need of reboring or honing since all that is necessary when the liner becomes worn is to knock out the liner and replace it with a new one.

In some cases it may be found desirable to form the bore on a taper so that all that is needed would be to bore one end of the sleeve onto the shoulder, and the other end would contact the smaller end of the tapered bore and form a tight joint.

Having described my invention, what I regard as new and desire to secure by Letters Patent is:

1. A cylinder lining comprising the combination thereof with a cylinder having a longitudinal inner bore of larger diameter than said liner, a shoulder on said inner bore adjacent one end of said cylinder which press fits said liner, one end of said liner adapted to be outwardly expanded whereby when said end is expanded into position it will be forced into a tight union with said cylinder bore.

2. A cylinder lining comprising the combination thereof with the master cylinder of a hydraulic braking system having a longitudinal inner bore of larger diameter than said liner, a shoulder on the said inner bore adjacent one end of said cylinder onto which said liner is pressed tightly, one end of said liner adapted to be outwardly expanded whereby when said end is expanded into position it will be forced into a tight union with said cylinder bore.

3. A new article of manufacture, a master cylinder for hydraulic braking systems consisting of a metal cylinder having an inner bore which extends axially thereof, an annular shoulder adjacent one end of said bore, a tubular sleeve of smaller diameter than said bore, one end of said sleeve being press fitted to and coinciding with said shoulder, and engaging therewith, the other end of said sleeve adapted to be outwardly expanded so that when pressed by expansion in intimate relation with the annular wall of said master cylinder the expanded end will be under expansion stress, whereby the resilience of the metal will form a tight union with the walls of the cylinder.

4. In a new article of manufacture, a master cylinder of substantially uniform bore having a shoulder formed in one end thereof, a tubular sleeve of a diameter adapted to telescopically fit into the bore of said cylinder and be supported on one end by said shoulder, said sleeve having an annular portion on the other end thereof operative to be expanded into intimate annular contact with the inner wall of the end of the bore of said cylinder when said liner is forced into said cylinder.

ELIS L. LARSON.

REFERENCES CITED

The following references are of record in the file of this patent:

UNITED STATES PATENTS

| Number | Name | Date |
|--------|------|------|
| 172,102 | Ellis | Jan. 11, 1876 |
| 1,721,197 | Almen | July 16, 1929 |
| 2,412,587 | Larson | Dec. 17, 1946 |